Dec. 13, 1960   M. C. BRUDI   2,963,995
DOUGH DIVIDER AND TOPPING MACHINE
Filed Sept. 26, 1955   2 Sheets-Sheet 1
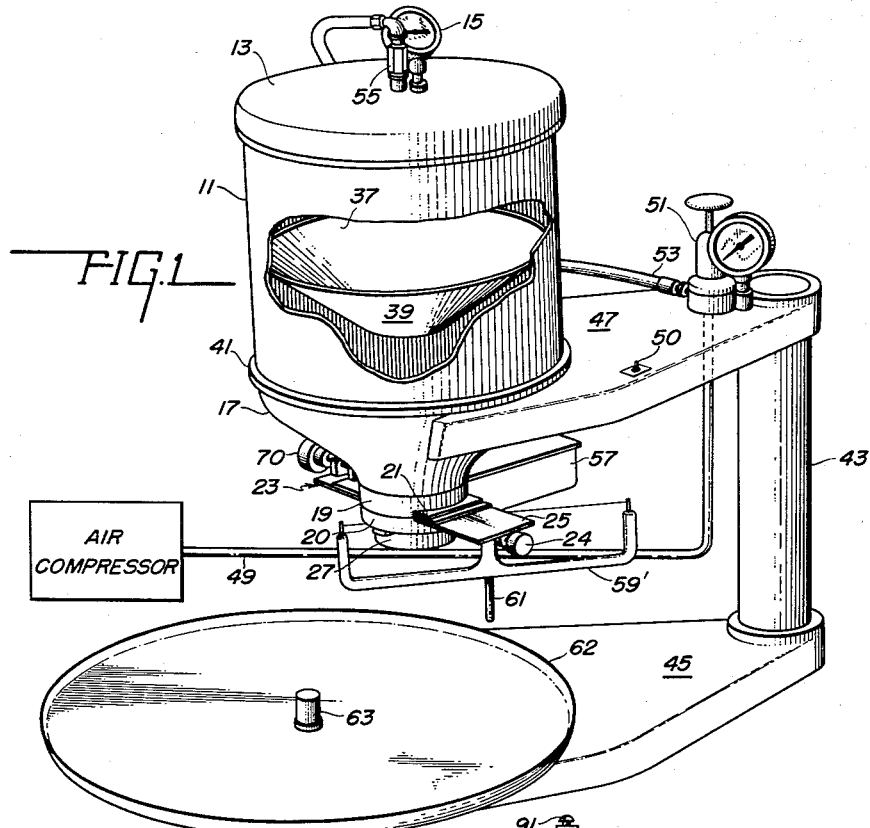
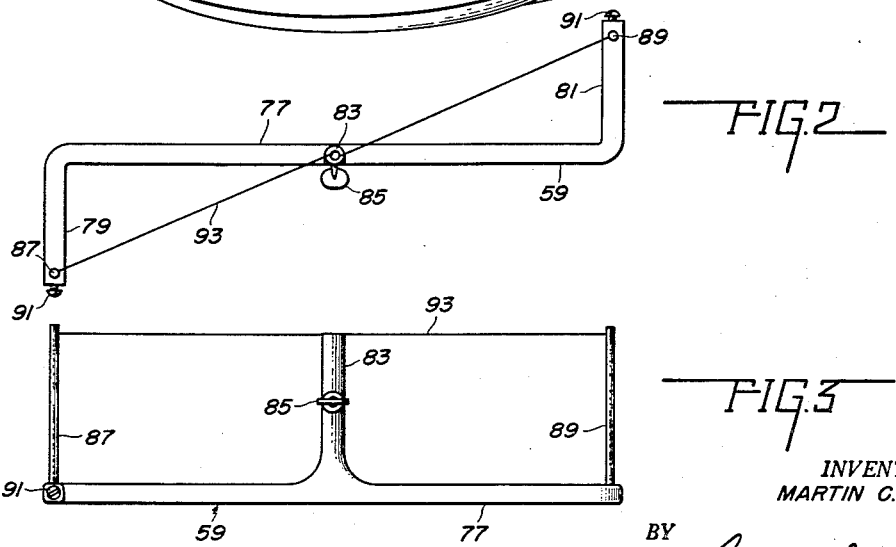
INVENTOR.
MARTIN C. BRUDI
BY
Albert L. Jeffers
ATTORNEY Dec. 13, 1960 M. C. BRUDI 2,963,995
DOUGH DIVIDER AND TOPPING MACHINE
Filed Sept. 26, 1955 2 Sheets-Sheet 2
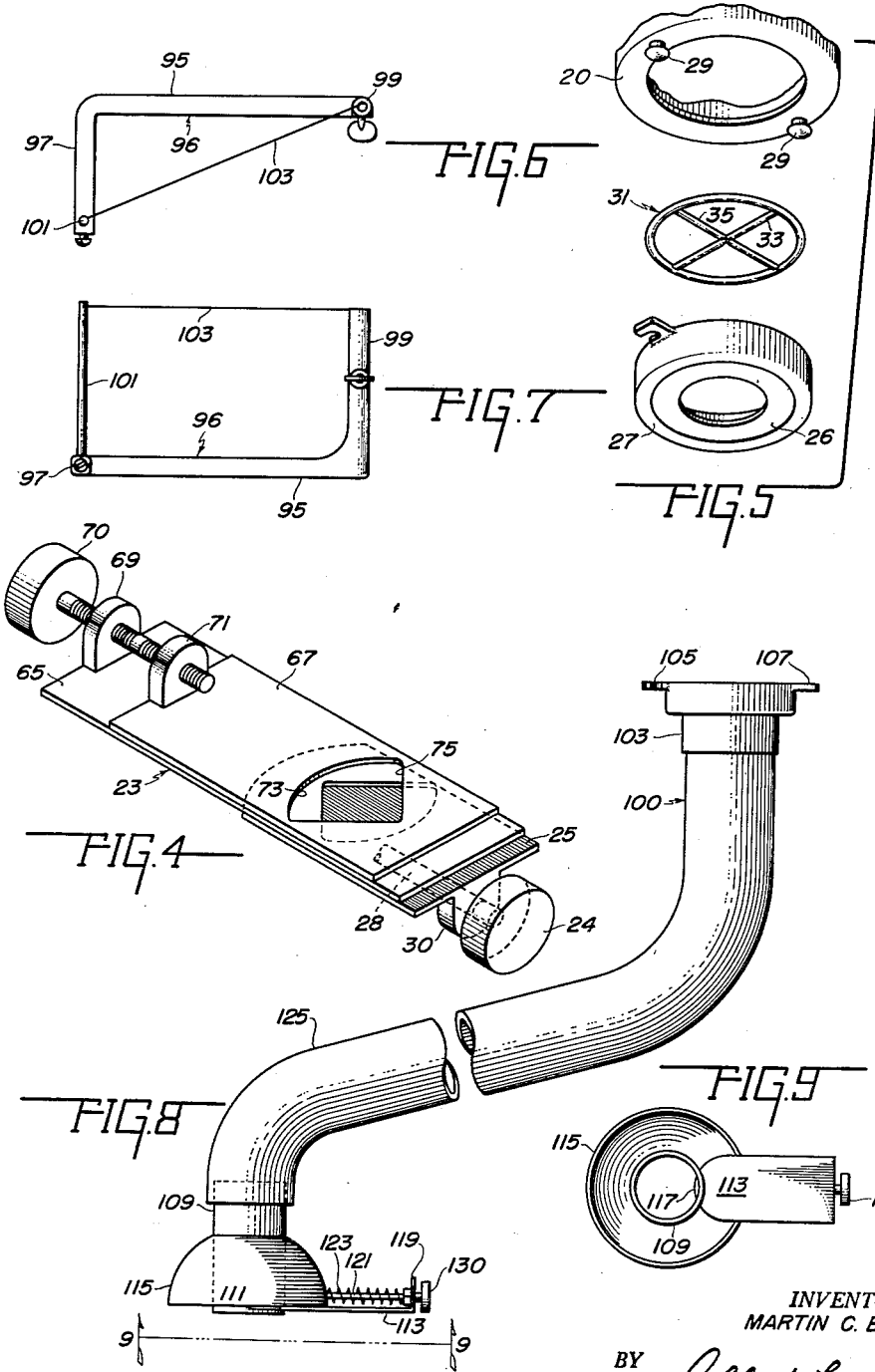
INVENTOR.
MARTIN C. BRUDI
BY Albert L. Jeffers
ATTORNEY

United States Patent Office 2,963,995
Patented Dec. 13, 1960

2,963,995
DOUGH DIVIDER AND TOPPING MACHINE

Martin C. Brudi, 4504 Oliver St., Fort Wayne, Ind.

Filed Sept. 26, 1955, Ser. No. 536,593

3 Claims. (Cl. 107—14)

This invention relates to a dough divider and topping machine and more particularly to a machine which is adapted for cutting or forming cookies, forming hamburger balls and may be used with fondant candies, baking powder biscuits, bun dough, yeast dough and pie dough.

It is a general object of the present invention to provide a machine which will uniformly supply dough under pressure from a tank, through an adjustable valve and provided with means for automatically cutting the dough into the proper thickness to form the cookies.

An important object of the invention is to provide an adjustable valve for regulating the delivery of the dough from the tank to the die.

A further object of the invention is the provision of adjustable cutting means.

A still further object of the invention is to provide means for manually closing the valve.

Yet another object of the invention is the provision of an attachment for the machine described which is used for manually cutting or forming cookies and for directly dropping them on a pan or topping plate.

A further object of the invention is the provision of a rotating topping table in a close proximity to the cutter.

A salient object of this invention is to provide a machine of the kind described which is sturdy and durable in construction, reliable and efficient in operation, relatively simple and easy to manufacture.

Other objects and features will in part be obvious, and in part be pointed out as the description of the invention proceeds, and shown in the accompanying drawing, wherein there is disclosed a preferred embodiment of this inventive concept.

In the drawings:

Figure 1 is a perspective view illustrating this invention;

Figure 2 is a top view of the adjustable cutter;

Figure 3 is a side elevation of the adjustable cutter illustrated in Figure 2;

Figure 4 is a perspective view of the adjustable valve and manual shut-off gate;

Figure 5 is an exploded view showing parts of the die set, die and divider;

Figure 6 is a top view showing a modification of the adjustable cutter;

Figure 7 is a side elevation of the cutter illustrated in Figure 6;

Figure 8 is a side elevation of the attachment for the machine illustrated in Figure 1; and Figure 9 is a bottom view taken substantially on line 9—9.

Referring to the drawings in detail, the numeral 11 designates a pressure tank or container having a removable cover 13 provided with a conventional locking means similar to that used on a pressure cooker. A pressure gage 15 is mounted on top of the cover and communicates with the interior of the tank. The tank is preferably circular in cross section with the lower end 17 forming a conical portion which terminates in a hollow cylinder member 19 having a transverse slot 21 for receiving the adjustable gate valve 23. A hollow cylinder member 20 is connected to the member 19 and is provided with a slot to receive the manual shut-off gate or valve 25. The die set 27 is provided with a die 26 having an opening and is attached to the member 20 by screws 29. The die 26 shown in Figure 5 is adapted to shape round cookies, and it is to be understood that other dies of different configuration such as stars, animals and Christmas motifs may be substituted for the die illustrated. A divider ring 31 having cross bars 33 and 35 is positioned within the die 26 and serves to spread the dough as it passes through the die. The divider, also, has a tendency to give more stability to thin dough and prevents seeping around the edge of the die.

A follower 37 having a conical portion 39 is disposed within the tank and is provided with sufficient clearness to slide up and down therein.

A ring or flange encircles the tank at 41.

The numeral 43 indicates a post which is mounted on a base 45. A member or arm 47 having a yoke or fork is attached to the post and functions to support the tank 11.

The air compressor is connected to the tank through a line 49, regulator 51, line 53 having a quick disconnect coupling at each end and a nipple or adapter 55.

A motor 57 having a conventional reducing gear (not shown) is mounted on the bottom side of the arm 47. The motor 57 rotates the shaft 61 thereby rotating the cutter 59' which is positioned so that one arm of the cutter is approximately centered under the die 27.

A circular topping plate or drum 62 is rotatably mounted on a vertical shaft 63 which extends from a conventional motor (not shown).

As shown in Figure 4, the adjustable valve 23 is constructed of two rectangular plates 65 and 67, having a threaded ear or projection 69 and 71 at one end, respectively. Each plate is provided with an opening 73 and 75, respectively, near the other end of the plate. The openings may be of any size or shape; however, it is preferred to use an opening having two straight sides which intersect each other at approximately 45 degrees with an arc connecting the outer two points. The adjustable valve is mounted in slot 21 of member 19. The member 19 is provided with a threaded opening (not shown) for receiving the end of the screw 70 and functions to center the valve therein. The end of the screw may be provided with a nut or pin to prevent the screw from being accidentally disengaged from the member 19.

The manual shut-off valve 25 is constructed of a solid rectangular plate having one end formed in an arc to fit the curvature of the cylinder member 20. The other end of the plate is provided with an ear 30 having a threaded opening to receive the screw 24.

The member 20 is provided with an opening (not shown) to slidably receive the screw 24 and functions to center the valve in the slot provided in the member 20.

As illustrated in Figures 2 and 3, the cutter 59 comprises a bar 77 provided with legs 79 and 81 turned approximately 90 degrees in the opposite direction in the shape of a Z. A post 83 having a bore for receiving the shaft 61 extends upwardly near the center of the bar and is provided with a set screw 85. The legs 79 and 81 have a bore for receiving vertical posts 87 and 89 which may be adjusted to different lengths by the screws 91. A wire knife 93 is attached to the vertical posts 87 and 89.

As shown in Figures 6 and 7, the cutter can be constructed in the form of an L having a bar 95 and leg 97. The center post 99 and vertical post 101 are similar to the center post 83 and vertical post 87, respectively. The wire knife 103 is attached to the center post 99 and vertical post 101.

The attachment 100 shown in Figures 8 and 9 can be substituted for the cutter 59 when it is desired to cut the cookies manually. The attachment comprises a coupling member 103 having ears 105 and 107 which are fastened to the member 19 by screws 29. A tubular member 109 is provided with a horizontal slot 111 which extends approximately half way therethrough and is adapted to receive a cutter plate 113. A bell-shaped shield 115 having a central opening is mounted on the member 109. The plate 113 is rounded at 117 to conform to the radius or curvature of the tubular member 109. The other end of the plate is provided with an upturned flange 119 having an opening for receiving one end of the rod 121. The bell 115 and member 109 are provided with openings for receiving the other end of the rod 121. A spring 123 is mounted on the rod 121 between the flange 119 and bell 115 and serves to hold the plate in the normal position illustrated in Figure 9. A flexible hose 125 connects the tubular member 109 with the coupler 103.

Operation

Prior to the operation of the machine, the manual shut-off valve is closed. The cover and follower are removed and the dough containing the proper constituents is placed in the tank 11. The follower 37 is then placed on top of the dough, and the cover 13 secured to the tank.

The control valve 23 is then adjusted by turning the screw 70 to give the proper opening through which the dough passes. Air from the air compressor is then supplied to the top of the follower 37 through line 49, regulator 51, line 53 and nipple 55. The regulator is set to maintain a constant pressure of 3 to 15 pounds per square inch, depending on the thickness of dough used.

The cutter is then raised or lowered on the shaft 61 to the proper distance from the die 27. In the usual operation is is preferred that the wire knife be set to contact or touch the bottom of the die. The cutter is then secured to the shaft by turning the set screw 85.

The motor 53 is energized by throwing the switch 50, and the cutter is rotated at a relatively low speed. The manual shut-off plate 25 is then pulled to the open position shown in Figure 1 whereby the dough in the tank 11 is pressed by the follower through the hollow members 19 and 20, divider 31 and out the opening in the die 26.

The dough passing from the die is cut into slices by the wire knife 93 falling to the topping plate or tray 61 where the slices are then automatically topped or decorated with the desired confections. It should be noted that the offset feature of the legs 79 and 81 of the cutter permits the slices to fall upon the tray 61 without contacting the bar 77. The size of the cookies may then be controlled by adjustable control valve and the increase or decrease of air pressure.

The operation using the cutter 96 is the same as that for using the cutter 59.

When the attachment 100 is used, the motor 57 and cutter 59 are eliminated. The die 26 is removed and the coupler 103 is attached to the member 19 by the screws 29. The slicing of the cookies is then accomplished by manually pressing the button 130 which activates the cutter plate 113. The cookies may be dropped on a pan, tray or topping drum as desired.

While there have been disclosed herein a preferred form and an attachment for the invention for the purpose of illustration, it is obvious that various changes may be made in the form, construction and arrangements of the parts without departing from the spirit of the invention, and I do not wish to be limited to the specific form disclosed but desire protection falling fairly within the scope of the appended claims.

I claim:

1. A divider and topping machine comprising, in combination, a pressure tank having a conical bottom portion which terminates with an opening, a first hollow member having a transverse slot for receiving an adjustable valve, said first member connected to the conical bottom portion of the tank, a second hollow member connected to the first hollow member, a die set having a die connected to said second member, said valve adapted to control the flow of dough to said die, a follower provided with a conical surface on the underneath side disposed in the tank, means for supplying air pressure to the tank for forcing the contents through the opening, valve and die, means for cutting the contents into slices and means for receiving the contents from the cutting means.

2. A dough divider and topping machine comprising, in combination, a pressure tank provided with a conical bottom portion having an opening therein, an adjustable valve, a first hollow cylinder member having a transverse slot for receiving the adjustable valve, a manual shut-off valve disposed in juxtaposition with respect to said adjustable valve, a second hollow cylinder member having a slot for receiving the shut-off valve, a die set provided with a die connected to said second member, a follower having a conical portion on its bottom side disposed in said tank, means including a regulator for supplying air pressure to the top of the follower which forces the dough from the tank through the opening in the conical bottom portion, the first hollow cylinder member, the adjustable valve, the second hollow cylinder member and the die, means including a wire knife for cutting the dough into slices and topping means for receiving the slices.

3. An attachment for a dough divider and topping machine comprising, in combination, a coupling member, a tubular member, a flexible tube connecting the coupling member and tubular member and means including a cutter plate for cutting the dough into slices, a support for mounting the cutter plate in its normal position adjacent the tubular member, and resilient means mounted on the support to return the cutter plate to its normal position after it has been manually actuated.

References Cited in the file of this patent

UNITED STATES PATENTS

| | | |
|---|---|---|
| 1,393,872 | Winans | Oct. 18, 1921 |
| 1,444,041 | Schulz et al. | Feb. 6, 1923 |
| 1,488,669 | Luehrs | Mar. 13, 1923 |
| 2,090,095 | Bainbridge | Aug. 17, 1937 |
| 2,256,617 | Kipnis | Sept. 23, 1941 |
| 2,592,657 | Cierley | Apr. 15, 1952 |